April 4, 1961

J. WENZ 2,977,827

CUTTING APPARATUS

Filed April 27, 1953

April 4, 1961 J. WENZ 2,977,827
CUTTING APPARATUS
Filed April 27, 1953 3 Sheets-Sheet 3

Inventor
JOHN WENZ
By
C. R. Miranda
Attorney

# United States Patent Office 2,977,827
Patented Apr. 4, 1961

2,977,827
CUTTING APPARATUS
John Wenz, Plainfield, N.J., assignor to Foster Wheeler Corporation, New York, N.Y., a corporation of New York
Filed Apr. 27, 1953, Ser. No. 351,255
4 Claims. (Cl. 77—55)

This invention relates to cutting apparatus and more particularly to apparatus employing rotatable cutting tools. Specifically, the present invention is directed to cutting apparatus which employ cutting tools wherein fluid is passed through passageways formed in the tools.

The present invention has special application to cutting apparatus which utilize gun drills though it is not necessarily limited to such types of cutting tools. Gun drill is a term commonly employed by those skilled in the art to designate a cutting tool of substantially circular cross-section which has a cutting edge formed at one end. A passageway is provided in the tool through which a fluid under pressure is passed and the fluid emerges adjacent the cutting edge. The fluid, among other things, is used to carry away chips formed in the cutting of an aperture in a work piece and the fluid and chips travel along a passageway defined by the wall of the aperture and a longitudinal cut-out section in the tool.

Cutting apparatus employing gun drills are of the horizontal type, that is, the gun drill and work piece are both arranged horizontally and the work piece moves while the drill is maintained stationary during the cutting operation. Generally, the work piece is rotated and the cutting tool cuts a single aperture therein. When the work piece requires the cutting of more than one aperture then the use of the above-mentioned horizontal type cutting apparatus is impractical because of dynamic unbalance encountered in rotating the work piece. In order to solve this problem, attempts have been made to provide cutting apparatus wherein the work piece is maintained stationary and a cutting tool, other than a drill of the gun drill type, is rotated and fluid is applied into the aperture being formed in the work piece to flush out the chips; these attempts, however, have been unsuccessful.

In accordance with the present invention novel means are provided whereby cutting aparatus employing cutting tools, as for example gun drills, may be utilized for forming one or more openings in a work piece which is maintained stationary.

With the arrangement of the present invention gun drills can be employed with cutting apparatus wherein the cutting tool is movable and the work piece is maintained stationary, as for example in radial type drill presses. The gun drill is fed with fluid by means of a novel arrangement which provides adequate flow of fluid to the tool while the latter rotates and moves axially.

The particular features and advantages which characterize the invention will be understood from the following description when considered in connection with the accompanying drawings forming a part thereof and in which.

Like characters refer to the same or similar parts throughout the several views.

Figure 1:
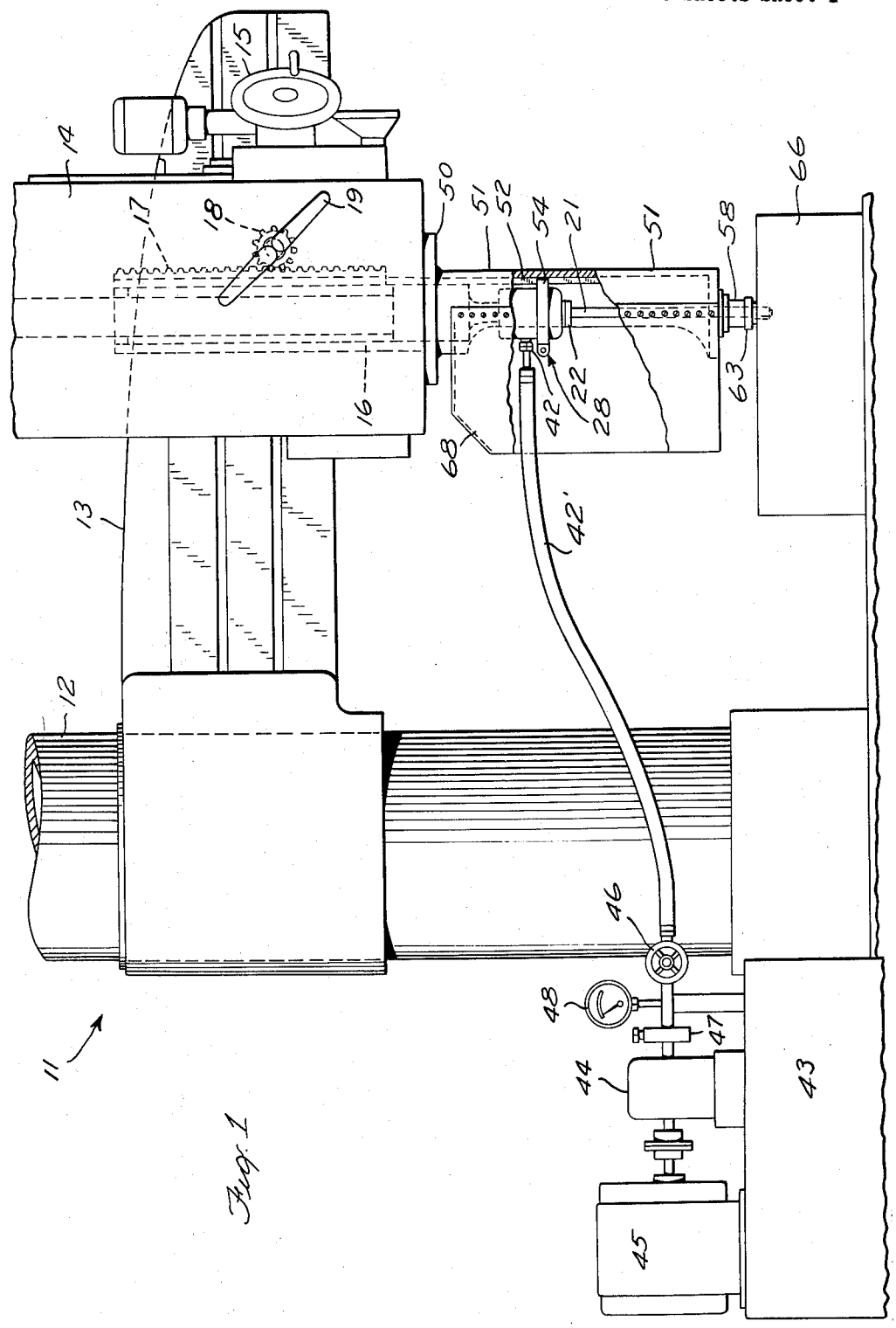
Fig. 1 is a vertical view illustrating, more or less diagrammatically, cutting apparatus embodying the present invention.

Referring now to the drawings for a more detailed description of the present invention and more particularly to Fig. 1 thereof, a novel arrangement of the invention is shown as embodied in a radial type drill press, generally designated by the numeral 11, which comprises a column 12 (partly shown). An arm 13 is pivotally mounted on column 12 and carries a head 14 movable longitudinally of the arm and controlled in its movement by a control wheel 15. Arranged in head 14 is a spindle 16 which is moved longitudinally or axially thereof by a conventional rack 17 and a pinion 18, shown in broken lines in Fig. 1. A pair of handles 19 are disposed on the front of head 14 and effect rotation of the pinion 18 either directly by manual drive or by motor drive (not shown), according to which type of drive is desired. A motor (not shown) is positioned in head 14 for rotating spindle 16.

Figure 4:
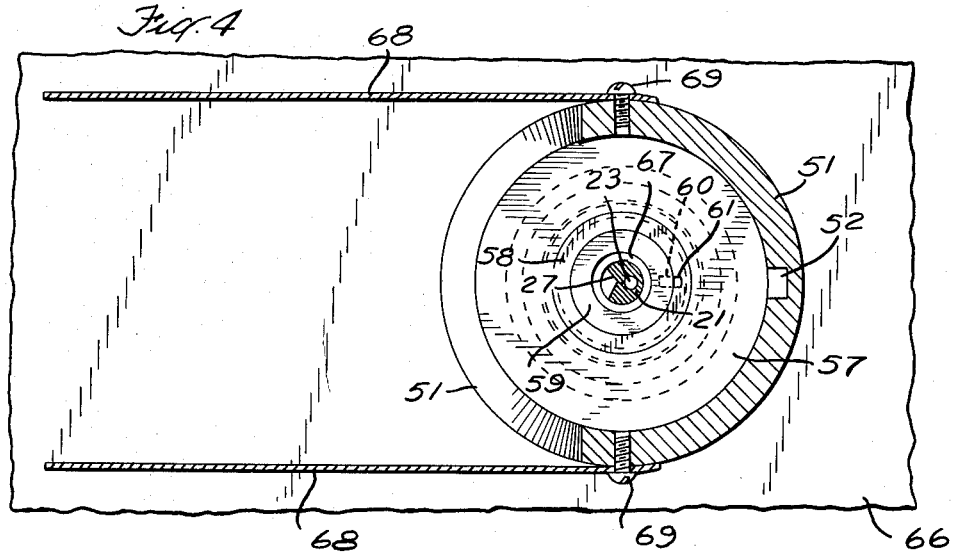
Fig. 4 is an enlarged transverse sectional view taken on line 4—4 of Fig. 2.

Spindle 16 has a tapered opening (Fig. 2) which accommodates one end of a "Morse" tapered socket member 20 and the two are secured for conjoined movement by a key (not shown). A cutting tool 21 has one end disposed in a tapered slot formed in socket 20 and is secured to the latter by a threaded bushing 22 which enters the slot and wedges the tool against the walls of the slot upon rotation of the bushing in the proper direction. A longitudinally extending passageway 23 is formed in tool 21 with a transversely extending inlet opening 24 which registers with a passageway 25 in socket member 20 when the tool and socket are assembled. Passageway 23 has an outlet opening (Fig. 2) adjacent the other end of the tool, said other end having a cutting edge 26 thereat. A longitudinally extending cut-out section or groove 27 is formed in tool 21 (Fig. 4) for a purpose to be described hereinafter.

Figure 2:
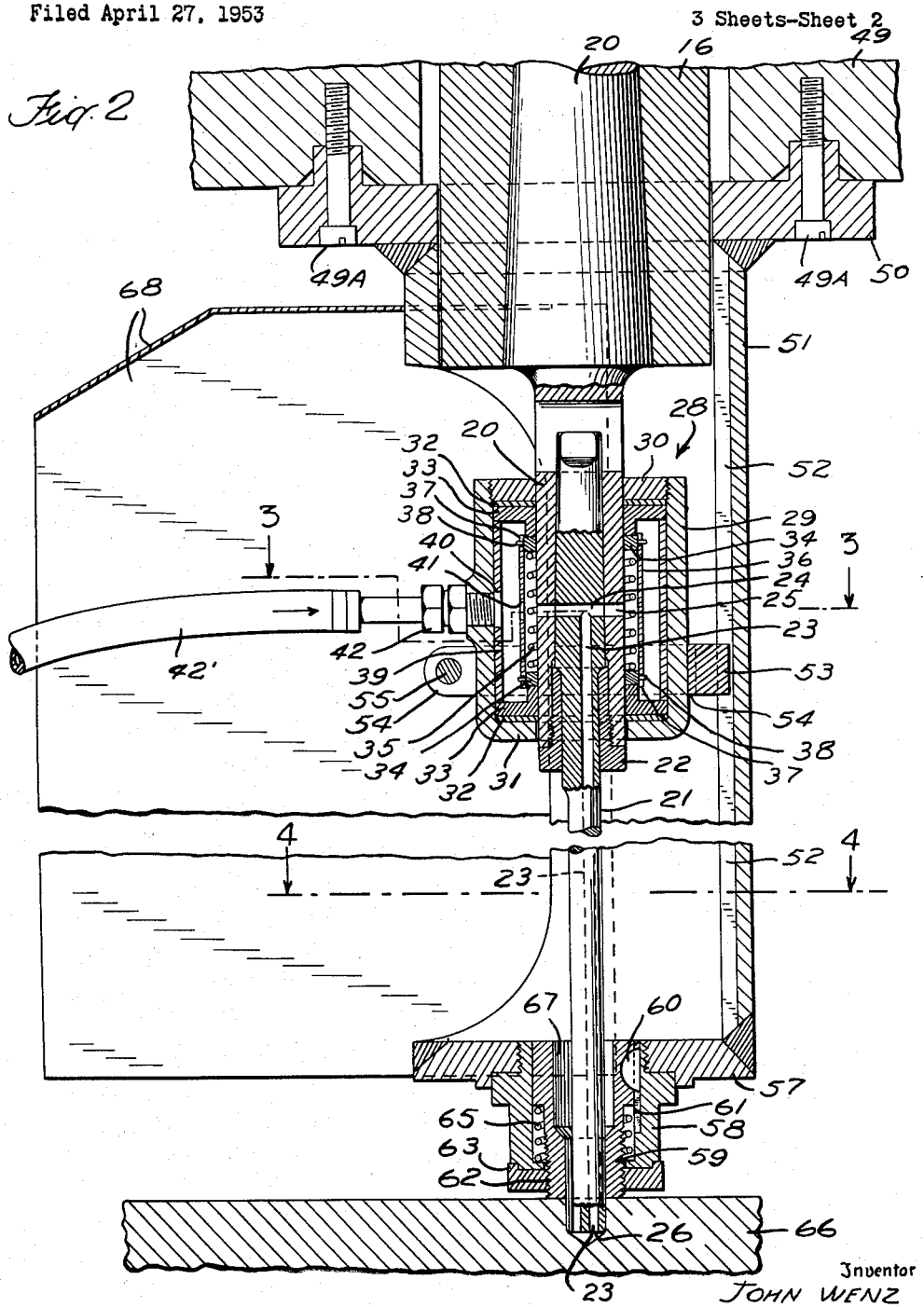
Fig. 2 is an enlarged vertical sectional view of a portion of the apparatus of Fig. 1.

Means are provided for feeding fluid to passageway 23 during rotational and longitudinal movement of tool 21, which means comprises a union, generally designated by the numeral 28 (Fig. 2). Union 28 includes a substantially cylindrical container 29 having a threaded and removable end wall 30 and an integrally formed end wall 31. Container 29 is carried by socket member 20 and the end walls have openings therein through which the socket passes. A pair of washers 32 is provided within container 29 adjacent the end walls thereof and the washers are secured to socket 20 by any suitable means, as for example, threaded members (not shown) engaging both the washers and the socket, to provide movement of the container with the socket in a longitudinal direction. Arranged adjacent to and in engagement with washers 32 are a pair of sealing gaskets 33 which are secured to container 29 by means not shown. A pair of sealing rings 34 are loosely arranged on socket member 20 and are brought into and maintained in engagement with gaskets 33 by a coil spring 35 on the socket member. A cylindrical shell 36 is fitted on socket member 20 and over coil spring 35 and has open ended slots 37 formed in the peripheral edges thereof which cooperate with pins 38 on sealing rings 34 thereby providing for floating movement of the shell in a longitudinal direction but restraining rotational movement thereof relative to the rings. A second cylindrical shell 39 of greater diameter than shell 36 is arranged concentrically therewith and is secured to the container 29 in any suitable manner. Shell 39 has an opening 40 in alignment with an opening 41 in shell 36 and with a threaded opening formed in container 29.

A threaded fitting 42 is disposed in the threaded opening formed in container 29 and is connected to a flexible conduit or hose 42' communicating with a source of fluid as for example, a reservoir 43 (Fig. 1). The fluid may be liquid or gas and is drawn from the reservoir by a pump 44 which is driven by a motor 45. A manually operable valve 46 is provided to control passage of fluid into hose 42' and a relief valve 47 prevents excess pressure in the hose. A gage 48 indicates to an observer the pressure in the line connecting the pump and hose.

With the arrangement just described, fluid flows from reservoir 43 through hose 42' thence into the container by way of opening 40 in shell 39. The concentric arrangement of the shells provides a reservoir or chamber for the fluid and the fluid passes through opening 41 of shell 36 thence through passageway 25 into inlet opening 24, and finally, to passageway 23 from whence it emerges from the tool through the outlet opening in the latter. It should be understood that washers 32 in addition to providing for longitudinal movement of the container with the socket member also obviate leakage of fluid along the threaded portion of end wall 30 and the openings in the end walls. Furthermore, flow of fluid in a leakage path passing between the sealing gaskets 33 and rings 34 and thence along socket member 20 and through the openings in the end walls is obviated by the frictional engagement of gaskets 33 with rings 34.

Figure 3:
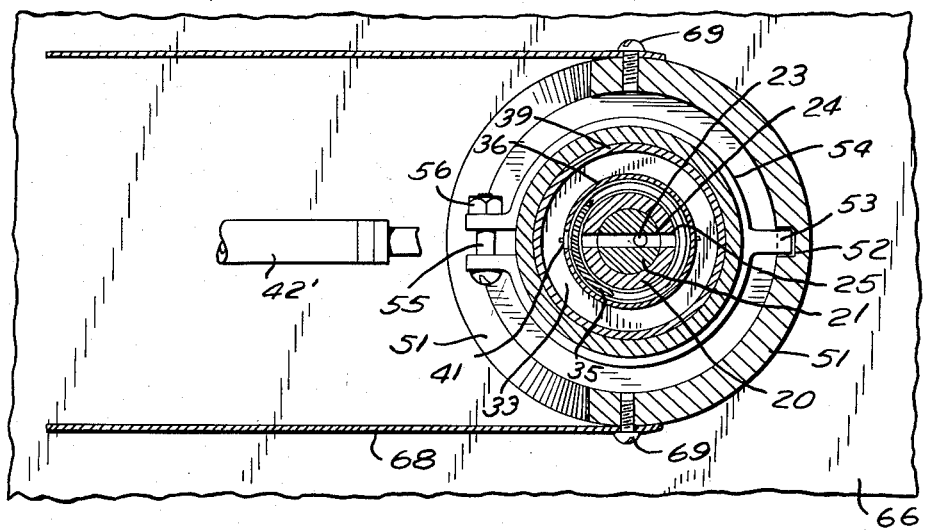
Fig. 3 is an enlarged transverse sectional view taken along line 3—3 of Fig. 2.

Secured to an adapter 49 on head 14 by threaded members 49A (Fig. 2) is a member 50 from which depends a fixture member 51 having a longitudinally extending guide slot 52 formed therein. A tongue-like member 53 projects into slot 52 and is free for longitudinal movement therein. Tongue 53 is secured in any suitable manner, as by welding, to a flexible band 54 encircling the sides of container 29. The ends of band 54 are connected together by a threaded bolt 55 and a nut 56 (Fig. 3) which secure the band to the container. By reason of the foregoing construction, any tendency on the part of the container to rotate with rotational movement of the socket member is prevented.

It may now be seen that union 28, together with the cooperating structure described hereinbefore, provide an arrangement whereby fluid is effectively fed to the passageway of a cutting tool while the latter rotates and moves longitudinally.

Fixture member 51 has a portion 57 extending transversely of the axis of the cutting tool and the member has a threaded aperture cooperating with an externally threaded portion of a bushing 58. Arranged within bushing 58 is a guide bushing 59 which can move axially but is prevented from rotating by a key 60 secured thereto, which key projects into a longitudinally arranged keyway 61 formed in bushing 58. Guide bushing 59 has an externally threaded portion 62 which engages the threaded portion of a rotatable nut 63 and upon rotation of the latter in proper direction guide bushing 59 moves downwardly against the bias of a coil spring 65 arranged between guide bushing 59 and bushing 58. In Fig. 2 the guide bushing 59 is shown displaced to a position wherein it fixedly engages a work piece 66 partly shown, which work piece is mounted on a table (not shown). An aperture 67 is formed in guide bushing 59 and consists of an upper portion and a lower portion which lower portion is of smaller cross-sectional area than the upper portion. The dimensions of the lower portion of aperture 67 are selected to provide a snug relationship with the cutting tool which passes therethrough so as to maintain the tool concentric with the spindle 16 when the tool operates in the cutting of work piece 66. A substantially U-shaped shield 68 is secured to fixture member 51 by screws 69 (Figs. 3 and 4), the top of the shield being closed while the bottom and one side thereof are open.

In operation, the work piece is first placed on the table (not shown) and the latter is vertically adjusted until the top surface of the work piece is adjacent the bottom of guide bushing 59. Cutting tool 21 is then moved into cutting position and nut 63 is rotated in the proper direction until the guide bushing 59 is in engagement with the work piece. Rotation of the tool is commenced, after which the fluid is supplied to the passageway 21 in the manner previously described. The fluid flows into the hole being formed and emerges therefrom through a passageway defined by groove 27 and the wall of the opening. In emerging from the opening, the fluid carries with it chips formed in the cutting of the opening. The fluid and chips travel upwardly through aperture 67 and outwardly of the bushing 59. The chips are prevented from striking the operator when they emerge from bushing 59 by the shield 68. In addition to maintaining the tool concentric with spindle 16, the guide bushing also serves to prevent the fluid and chips from escaping at the surface of the work piece adjacent the opening in the work piece. When the cutting operation is completed, the tool is withdrawn and nut 63 is rotated to disengage the bushing 59 from the work piece. To cut another opening in the work piece, head 14 is moved along the arm and/or arm 13 is pivoted about column 12, and thereafter the procedure outlined above is repeated.

It may be readily understood from the foregoing that the present invention provides novel means whereby rotating cutting tools, as for example, gun drills may be employed with vertical type cutting appparatus wherein the work piece is maintained stationary. The provision of a union, of the type disclosed, permits the application of fluid to a passageway in the cutting tool while the latter rotates and moves longitudinally. In this manner, the number of openings to be formed in a work piece is limited to only the number desired. Furthermore, the provision of a guide bushing which engages the work piece prevents the fluid and the chips from escaping from the opening adjacent the surface of the work piece.

Although one embodiment of the invention has been illustrated and described in detail, it is to be expressly understood that the invention is not limited thereto. Various changes may be made in the design and arrangement of parts without departing from the spirit and scope of the invention as will now be understood by those skilled in the art.

What is claimed is:

1. Cutting apparatus of the class described comprises a rotatable and longitudinally movable spindle, a socket member secured to said spindle for movement therewith and having a passageway therein, a rod-like cutting tool secured at one end to said socket member and having a passageway therein with an inlet adjacent said one end communicating with the first mentioned passageway, and an outlet at the other end of said tool, said other end having a cutting edge formed thereat, a source of fluid under pressure, a substantially cylindrical container having openings formed in end walls thereof through which portions of the socket member and tool pass, said container being connected to said source and being in communication with the first mentioned passageway to provide flow of cutting fluid in the latter and in the second mentioned passageway during rotational and longitudinal movement of said socket member, a pair of sealing members arranged within said container, one adjacent each of said end walls and having openings through which the socket member passes, each of said sealing members being secured to said container for movement therewith, a pair of sealing rings loosely mounted on said socket member and each being arranged adjacent one of said pair of sealing members, means carried by said socket member and resiliently urging the sealing rings into engagement with their associated sealing members to prevent escape of fluid in a leakage path between the sealing members and sealing rings and along the socket member and through the openings in the end walls of the container, a pair of washers within the container having openings through which the socket member passes and each being interposed between one sealing member and an end wall, said washers being secured to said socket member to provide movement of said container with said socket member when the latter moves longitudinally, guide member having a guide slot therein, and means secured to said container including a tongue-like member projecting into the guide slot to prevent rotational movement of said container with rotational movement of said socket member.

2. Cutting apparatus of the class described for drilling an opening in a work piece, comprising a vertically movable and rotatable spindle, an elongated cutting tool connected for movement with said spindle and having a cutting edge at one end, said cutting tool having a passageway extending longitudinally with an outlet adjacent the cutting end, means for displacing said spindle and said cutting tool to cause the latter to engage a work piece to cut an opening in the work piece, means for supplying fluid to said passageway to provide flow of fluid under pressure therein during rotational and longitudinal movement of the tool, the cutting tool having a cut-out section which cooperates with the wall of the opening being cut in the work piece to provide a return passageway for flow of fluid and chips formed in the cutting of the opening, said cut-out section extending to the surface of the work piece during cutting of the opening and the pressure of said fluid being sufficient to cause the chips and fluid to emerge from the work piece, a member having a portion extending transversely of the axis of said tool, a shield carried by said member and extending above said transverse portion to substantially enclose the cutting tool above said transverse portion, and a guide member carried by and extending below said transverse portion, said guide member having an aperture in communication with the opening and through which the tool passes, said guide member further being in engagement with the surface of said work piece to cause the fluid and chips to pass through said aperture and into the space above the transverse portion enclosed by the shield.

3. Cutting apparatus of the class described for drilling an opening in a work piece, comprising a vertically movable and rotatable spindle, an elongated cutting tool connected for movement with said spindle and having a cutting edge at one end, said cutting tool having a longitudinally extending passageway with an outlet adjacent said cutting edge, a cut-out section formed in said tool and cooperating with the wall of an opening formed in the work piece to provide a chip and fluid return passageway, a container movable with the spindle but restrained from rotary movement therewith, an inner cylindrical member concentrically disposed in said container and cooperating with the wall of the container to define a fluid reservoir, said container and said inner cylindrical member each having an opening formed therein, a source of fluid, means connecting the source of fluid with the opening in said container for supplying the reservoir with fluid, the opening in the cylindrical member communicating with the passageway in said cutting tool to provide the latter with fluid regardless of the angular position of said cutting tool, the pressure of the fluid within said reservoir being sufficient to cause chips formed in the cutting of the opening of the work piece and said fluid to flow out of said opening through the chip and fluid return passageway.

4. Cutting apparatus of the class described for drilling an opening in a work piece, comprising a vertically movable and rotatable spindle, a tool holding member carried by said spindle for movement therewith, an elongated cutting tool carried by said holding member and having a cutting edge at one end, said holding member and said cutting tool having passageways communicating with each other, the passageway of said cutting tool extending longitudinally with an outlet adjacent the cutting edge, a cut-out section formed in said tool and cooperating with the wall of an opening formed in the work piece to provide a chip and fluid return passageway, a source of fluid under pressure, a cylindrical container movable with the spindle but restrained from rotary movement and having openings in opposite ends through which the tool holding member extends, an inner cylindrical member concentrically disposed in said container and cooperating with the wall of the container to define a fluid reservoir, said container and said cylindrical member each having an opening formed in the walls thereof, means connecting the source of fluid with the wall opening in said container for supplying the reservoir with fluid, said opening in the cylindrical member communicating with the passageways in the holding member and cutting tool to provide the passageways with fluid regardless of the angular position of said cutting tool, the pressure of the fluid within said reservoir being sufficient to cause chips formed in the opening in the work piece and the fluid to flow out of the latter through the chip and fluid return passageway, and sealing means in said container disposed at the ends thereof where the tool holding member projects through the container for preventing leakage of fluid from the latter and along the projecting portions of the tool holding member.

References Cited in the file of this patent

UNITED STATES PATENTS

| | | |
|---|---|---|
| 580,398 | Hoenscheid | Apr. 13, 1897 |
| 594,330 | Cox | Nov. 23, 1897 |
| 838,999 | Hylander | Dec. 18, 1906 |
| 1,244,112 | Mackle | Oct. 23, 1917 |
| 2,182,770 | Woodcock | Dec. 5, 1939 |
| 2,325,973 | Nurnberger et al. | Aug. 3, 1943 |
| 2,418,021 | Fleischer | Mar. 25, 1947 |

FOREIGN PATENTS

| | | |
|---|---|---|
| 586,181 | Great Britain | Mar. 10, 1947 |